United States Patent
Huh et al.

(10) Patent No.: US 11,642,787 B2
(45) Date of Patent: May 9, 2023

(54) TRAJECTORY GENERATION OF A ROBOT USING A NEURAL NETWORK

(71) Applicant: SAMSUNG ELECTRONICS CO., LTD., Suwon-si (KR)

(72) Inventors: Jinwook Huh, Millburn, NJ (US); Galen Kailun Xing, Bronx, NY (US); Ziyun Wang, Philadelphia, PA (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 17/117,718

(22) Filed: Dec. 10, 2020

(65) Prior Publication Data

US 2021/0402602 A1 Dec. 30, 2021

Related U.S. Application Data

(60) Provisional application No. 63/046,075, filed on Jun. 30, 2020.

(51) Int. Cl.
  *G05B 19/04* (2006.01)
  *G05B 19/18* (2006.01)
  (Continued)

(52) U.S. Cl.
  CPC ............ *B25J 9/1666* (2013.01); *B25J 9/161* (2013.01); *B25J 9/163* (2013.01); *G01C 21/3446* (2013.01); *G05D 1/0221* (2013.01); *G05D 1/0251* (2013.01); *G05B 2219/33028* (2013.01); *G05B 2219/40455* (2013.01); *G05B 2219/40506* (2013.01)

(58) Field of Classification Search
  CPC .......... B25J 9/1666; B25J 9/161; B25J 9/163; G01C 21/3446; G05D 1/0221; G05D 1/0251; G05D 1/0217; G05B 2219/33028; G05B 2219/40455; G05B 2219/40506; G05B 2219/40447
  See application file for complete search history.

(56) References Cited

U.S. PATENT DOCUMENTS 10,065,311 B1   9/2018  Buschmann
11,331,799 B1 *  5/2022  Shafer .................... B25J 9/1664
(Continued)

*Primary Examiner* — Abby Y Lin
*Assistant Examiner* — Sohana Tanju Khayer
(74) *Attorney, Agent, or Firm* — Sughrue Mion, PLLC

(57) ABSTRACT

A method for generating a trajectory of a robot from a first configuration to a second configuration within an environment while steering away from obstacles may include obtaining physical workspace information associated with the environment in which the robot is configured to operate; obtaining, using a first neural network, a set of weights of a second neural network that is configured to generate a set of values associated with a set of configurations of the robot with respect to the second configuration; obtaining, by applying the set of weights to the second neural network, the set of values associated with the set of configurations of the robot with respect to the second configuration; and generating the trajectory of the robot from the first configuration to the second configuration within the environment, based on the set of values.

11 Claims, 10 Drawing Sheets

(51) Int. Cl.
  *B25J 9/16*    (2006.01)
  *G05D 1/02*    (2020.01)
  *G01C 21/34*   (2006.01)

(56) References Cited

U.S. PATENT DOCUMENTS

| | | | |
|---|---|---|---|
| 2013/0162481 A1* | 6/2013 | Parvizi | G01S 5/0205 |
| | | | 342/452 |
| 2014/0292770 A1* | 10/2014 | Beardsley | G06T 13/80 |
| | | | 901/1 |
| 2018/0133895 A1* | 5/2018 | Kwak | G05D 1/0282 |
| 2018/0364731 A1* | 12/2018 | Liu | G06V 10/40 |
| 2019/0291720 A1* | 9/2019 | Xiao | G06N 3/00 |
| 2021/0031368 A1* | 2/2021 | Drumwright | B25J 9/023 |

\* cited by examiner

TRAJECTORY GENERATION OF A ROBOT USING A NEURAL NETWORK

CROSS-REFERENCE TO RELATED APPLICATION(S)

This application is based on and claims priority under 35 U.S.C. § 119 to U.S. Provisional Patent Application No. 63/046,075, filed on Jun. 30, 2020, in the U.S. Patent & Trademark Office, the disclosure of which is incorporated by reference herein in its entirety.

BACKGROUND

1. Field

The disclosure relates to systems and methods for generating a trajectory of a robot from a first configuration to a second configuration within an environment while steering away from obstacles.

2. Description of Related Art

Motion planning is the task of generating robot commands which take a robot from an initial configuration to a goal configuration while avoiding collisions. It is one of the fundamental problems in robotics. Motion planning algorithms reason about the physical workspace in which the robot operates in as well as the robot's configuration space which relates the robot pose to the physical space. Workspace and configuration space information can be combined into a free configuration space map which partitions the space into regions that either are in collision or are free.

Traditional motion planning is computationally burdensome for practical robots, involving extensive collision checking and considerable iterative propagation of cost values.

SUMMARY

According to an aspect of an example embodiment, a method for generating a trajectory of a robot from a first configuration to a second configuration within an environment while steering away from obstacles may include obtaining physical workspace information associated with the environment in which the robot is configured to operate; obtaining, using a first neural network, a set of weights of a second neural network that is configured to generate a set of values associated with a set of configurations of the robot with respect to the second configuration, based on the physical workspace information; obtaining, by applying the set of weights to the second neural network, the set of values associated with the set of configurations of the robot with respect to the second configuration; and generating the trajectory of the robot from the first configuration to the second configuration within the environment, based on the set of values.

The first neural network may be a higher-order function network. The higher-order function network can generate a continuous function represented by a network. Further, the higher-order function generates weights of the continuous function network.

Each value of the set of values may represent a respective distance of a respective configuration with respect to the second configuration.

The set of values may be continuous for the configuration space which may be the space of all robot configurations.

The physical workspace information may refer to information associated with the physical space in which the robot is configured to move, allowed to move, etc.

Generating the trajectory may include generating the trajectory based on a gradient of the set of values.

The physical workspace information may be a point cloud associated with the environment, a two-dimensional image of the environment, or three-dimensional image of the environment.

Generating the configuration space map (e.g., configuration space map partitioning of the configuration space into collision and collision-free space in configuration space) comprises generating the configuration space map based on inputting the physical workspace information into a configuration space network configured to generate the configuration space map.

According to an aspect of an example embodiment, a device for generating a trajectory of a robot from a first configuration to a second configuration within an environment while steering away from obstacles may include a memory configured to store instructions; and a processor configured to execute the instructions to obtain physical workspace information associated with the environment in which the robot is configured to operate; obtain, using a first neural network, a set of weights of a second neural network that is configured to generate a set of values associated with a set of configurations of the robot with respect to the second configuration, based on the physical workspace information; obtain, by applying the set of weights to the second neural network, the set of values associated with the set of configurations of the robot with respect to the second configuration; and generate the trajectory of the robot from the first configuration to the second configuration within the environment, based on the set of values.

The first neural network may be a higher-order function network.

Each value of the set of values may represent a respective distance of a respective configuration with respect to the second configuration.

The set of values may be continuous for the configuration space map.

Generating the trajectory may include generating the trajectory based on a gradient of the set of values.

The physical workspace information may be a point cloud associated with the environment, a two-dimensional image of the environment, or three-dimensional image of the environment.

Generating the configuration space map comprises generating the configuration space map based on inputting the physical workspace information into a configuration space network configured to generate the configuration space map.

According to an aspect of an example embodiment, a non-transitory computer-readable medium may store instructions including one or more instructions that, when executed by one or more processors of a device for generating a trajectory of a robot from a first configuration to a second configuration within an environment while steering away from obstacles, cause the one or more processors to obtain physical workspace information associated with the environment in which the robot is configured to operate; obtain, using a first neural network, a set of weights of a second neural network that is configured to generate a set of values associated with a set of configurations of the robot with respect to the second configuration, based on the physical workspace information; obtain, by applying the set of weights to the second neural network, the set of values associated with the set of configurations of the robot with respect to the second configuration; and generate the trajectory of the robot from the first configuration to the second configuration within the environment, based on the set of values.

The first neural network may be a higher-order function network.

Each value of the set of values may represent a respective distance of a respective configuration with respect to the second configuration.

The set of values may be continuous for the configuration space map.

Generating the trajectory may include generating the trajectory based on a gradient of the set of values.

The physical workspace information may be a point cloud associated with the environment, a two-dimensional image of the environment, or three-dimensional image of the environment.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The example embodiments of the present disclosure are directed to generating a trajectory of a robot from a first configuration to a second configuration within an environment while steering away from obstacles. The embodiments of the present disclosure can generate a continuous set of values associated with a set of configurations of the robot with respect to the second configuration over an entire configuration space map much faster than approaches which construct configuration space map representations during execution.

Figure 1:
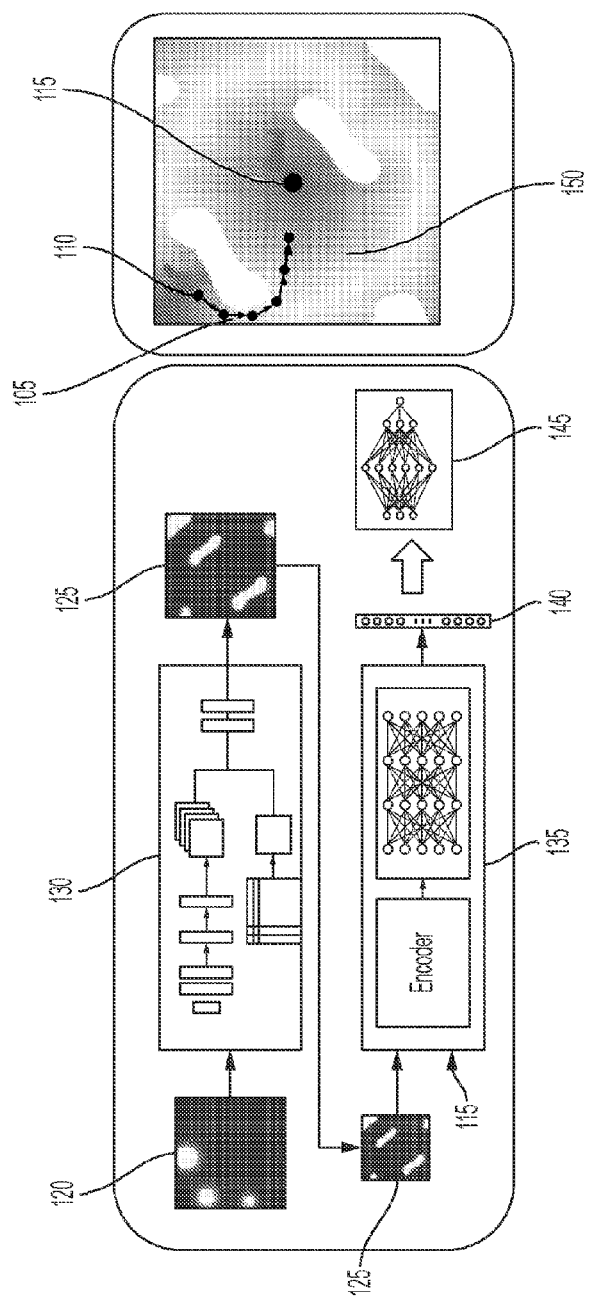
FIG. 1 is a diagram of a system for generating a trajectory of a robot from a first configuration to a second configuration within an environment while steering away from obstacles according to an embodiment.

FIG. 1 is a diagram of a system for generating a trajectory of a robot from a first configuration to a second configuration within an environment while steering away from obstacles according to an embodiment.

As shown in FIG. 1, a method for generating a trajectory 105 of a robot from a first configuration 110 to a second configuration 115 within an environment while steering away from obstacles may include obtaining physical workspace information 120 associated with the environment in which the robot is configured to operate.

As further shown in FIG. 1, the method may include generating a configuration space map 125 that partitions the environment into collision regions and non-collision regions, based on the physical workspace information 120. For example, as shown, the physical workspace information 120 may be input to a configuration space mapping network 130 in order to generate the configuration space map 125. The configuration space mapping network 130 may include several multilayer perceptron (MLP) layers which classify collision samples and collision-free samples in the configuration space.

As further shown in FIG. 1, the method may include obtaining, using a first neural network 135, a set of weights 140 of a second neural network 145 that is configured to generate a set of values 150 associated with a set of configurations of the robot with respect to the second configuration 115, based on the configuration space map 125 and the second configuration 115.

As further shown in FIG. 1, the method may include obtaining, by applying the set of weights 140 to the second neural network 145, the set of values 150 associated with the set of configurations of the robot with respect to the second configuration 115.

As further shown in FIG. 1, the method may include generating the trajectory 105 of the robot from the first configuration 110 to the second configuration 115 within the environment, based on the set of values 150.

The first neural network 135 (e.g., the higher-order function) can generate a function (e.g., in contrast to data), and the function can predict the values of given data. Further, the first neural network 135 can generate a cost-to-go function that predicts a cost-to-go given two configurations (e.g., data). That is, the first neural network 135 generates a continuous function (e.g., a cost-to-go function) given workspace conditions, and the robot can generate a trajectory to the goal point by following the gradient of this continuous function. The first neural network 135 generates weight values of the function represented by the second neural network 145.

The first neural network 135 may be trained by minimizing errors between the function's values (the function uses the weight of HOF output) and the dataset. In order to train the network, a generated dataset composed of 30,000 randomly generated workspaces was used to compute cost-to-go values in a configuration space using Dijkstra's algorithm, according to one embodiment. To compute cost-to-go values in the configuration space by using Dijkstra's algorithm, the configuration space (e.g. 360×360 cells in a 2D configuration space) was discretized and then cost-to-go of cells in the configuration space as computed by using Dijkstra's algorithm given a goal point (cost-to-go was changed by the workspace and goal point.).

At each training iteration, some cells were sampled from discretized cells in the configuration space (e.g., 2,000 in a 2D configuration space and 40,000 in a 3D configuration space), and these sampled cost-to-go values and cell locations were used for training so that network is trained by minimizing mean-square error (MSE) between the predicted cost-to-go by network and ground-truth cost-to-go by using Dijkstra algorithm, according to one embodiment. For example, for a given cell location, the predicted cost-to-go value should be close to the ground truth of the cost-to-go by using Dijkstra's algorithm. Further, while discretized cells are used during training, continuous values can be input in the network during training such as 135.26, 123.2, 1.34, etc., and the cost-to-go values can be computed for these locations. This one of the advantages of the cost-to-go HOF network.

Figure 2:
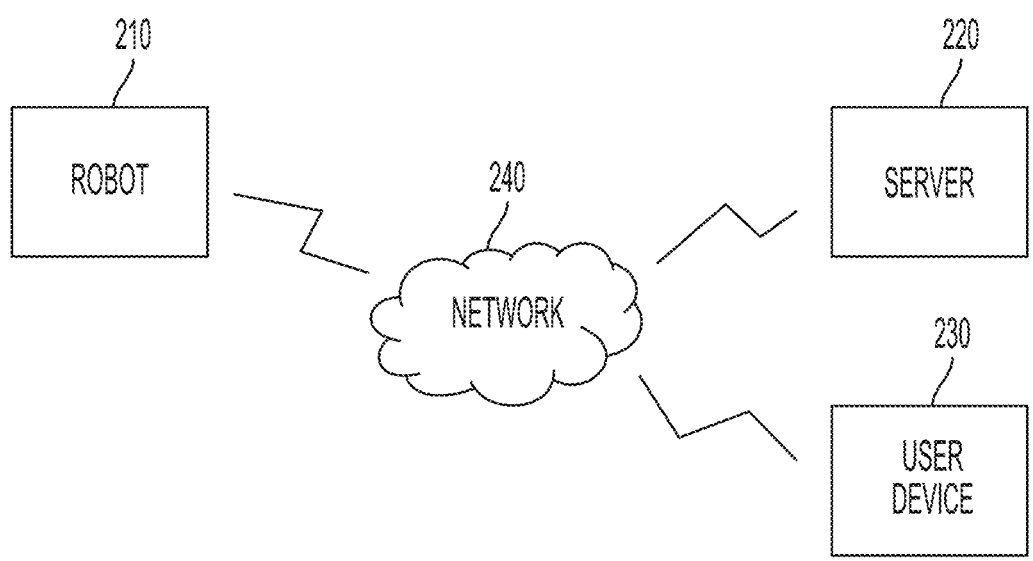
FIG. 2 is diagram of devices for generating a trajectory of a robot from a first configuration to a second configuration within an environment while steering away from obstacles according to an embodiment.

FIG. 2 is diagram of devices for generating a trajectory of a robot from a first configuration to a second configuration within an environment while steering away from obstacles according to an embodiment. FIG. 2 includes a robot 210, a server 220, a user device 230, and a network 240. The robot 210, the server 220, and the user device 230 may interconnect via wired connections, wireless connections, or a combination of wired and wireless connections.

Robot 210 includes one or more devices for generating a trajectory from a first configuration to a second configuration within an environment while steering away from obstacles. For example, robot 210 may be a robot used for industrial applications, service applications, military applications, vehicular applications, or the like.

Server 220 includes one or more devices configured to communicate with the robot 210. For example, server 220 may be a server that is configured to provide robot 210 with physical workspace information, a configuration space map, a trained first neural network, a trained second neural network, weight values of the second neural network, or the like.

User device 230 includes one or more devices configured to communicate with the robot 210. For example, user device 230 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
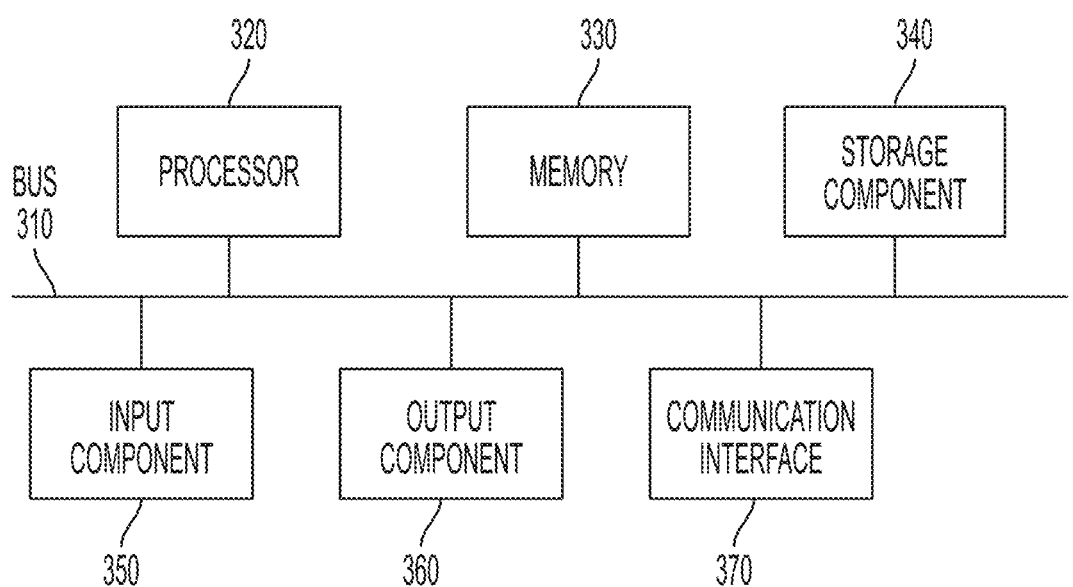
FIG. 3 is a diagram of components of one or more devices of FIG. 2 according to an embodiment.

FIG. 3 is a diagram of components of one or more devices of FIG. 2 according to an embodiment. Device 300 may correspond to the robot 210, the server 220, and/or the user device 230.

As shown in FIG. 3, the device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 320 includes one or more processors capable of being programmed to perform a function.

Memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits the device 300 to receive information, such as via user input (e.g., a touch screen display, a keyboard, a keypad, a mouse, a button, a switch, and/or a microphone). The input component 350 may include a sensor for sensing information (e.g., a global positioning system (GPS) component, an accelerometer, a gyroscope, and/or an actuator).

Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables the device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. The device 300 may perform these processes based on the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
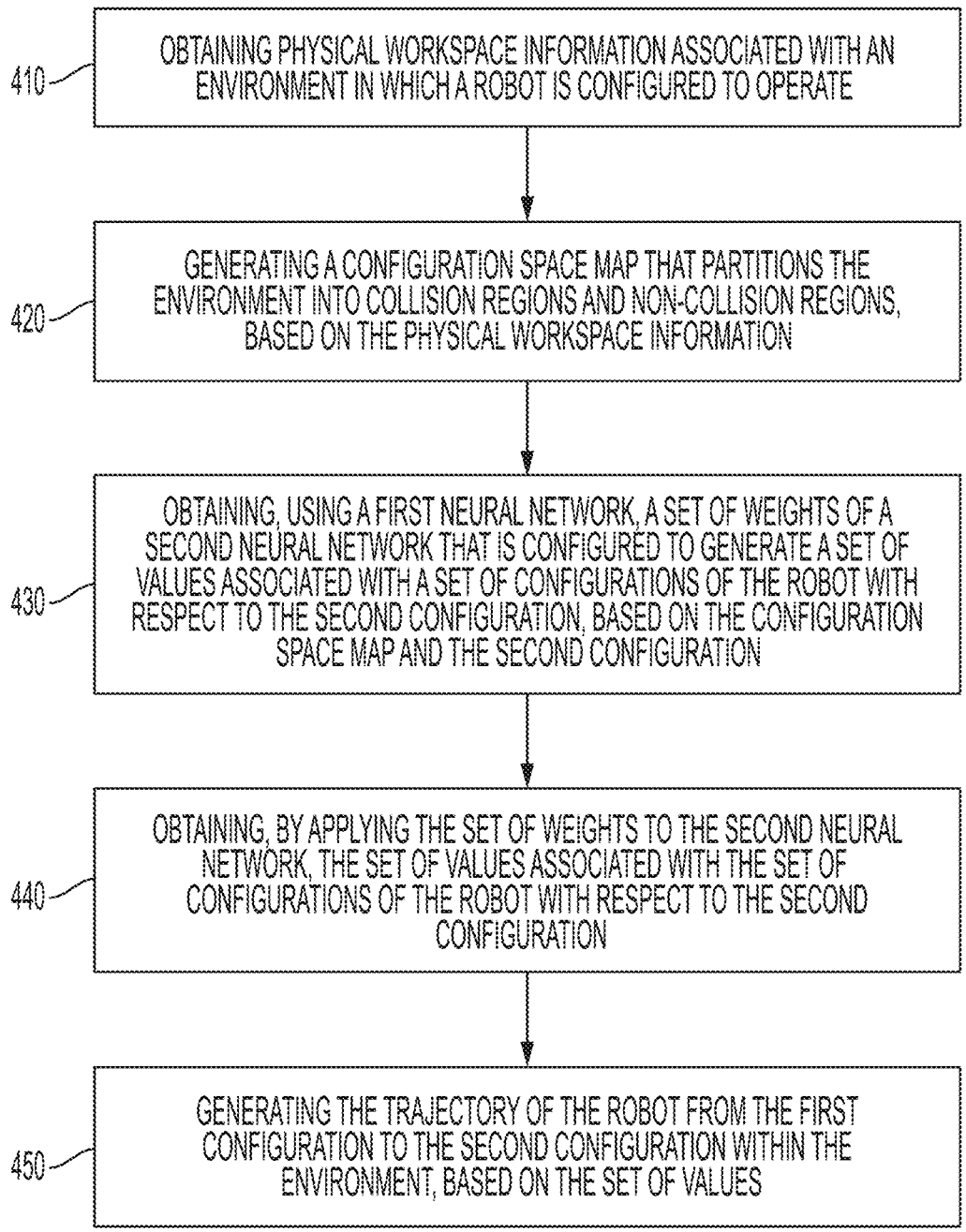
FIG. 4 is a flowchart of an example method for generating a trajectory of a robot from a first configuration to a second configuration within an environment while steering away from obstacles.

FIG. 4 is a flowchart of an example method for generating a trajectory of a robot from a first configuration to a second configuration within an environment while steering away from obstacles. According to some embodiments, one or more operations of FIG. 4 may be performed by the robot 210. Additionally, or alternatively, one or more operations may be performed by the server 220 and/or the user device 230.

As shown in FIG. 4, the method may include obtaining physical workspace information associated with the environment in which the robot is configured to operate (operation 410).

The robot 210 may obtain physical workspace information associated with an environment in which the robot is configured to operate. For example, the robot 210 may obtain the physical workspace information based on configuration information, based on obtaining the physical workspace information via a sensor, based on receiving the physical workspace information from the server 220 or the user device 230, based on a predetermined timeframe, based on an instruction, or the like.

The environment may refer to a physical space in which the robot is configured to operate. For example, if the robot is an industrial robot, then the environment may be an area of a manufacturing plant. As another example, if the robot is a service robot, then the environment may be a restaurant.

Figure 5:
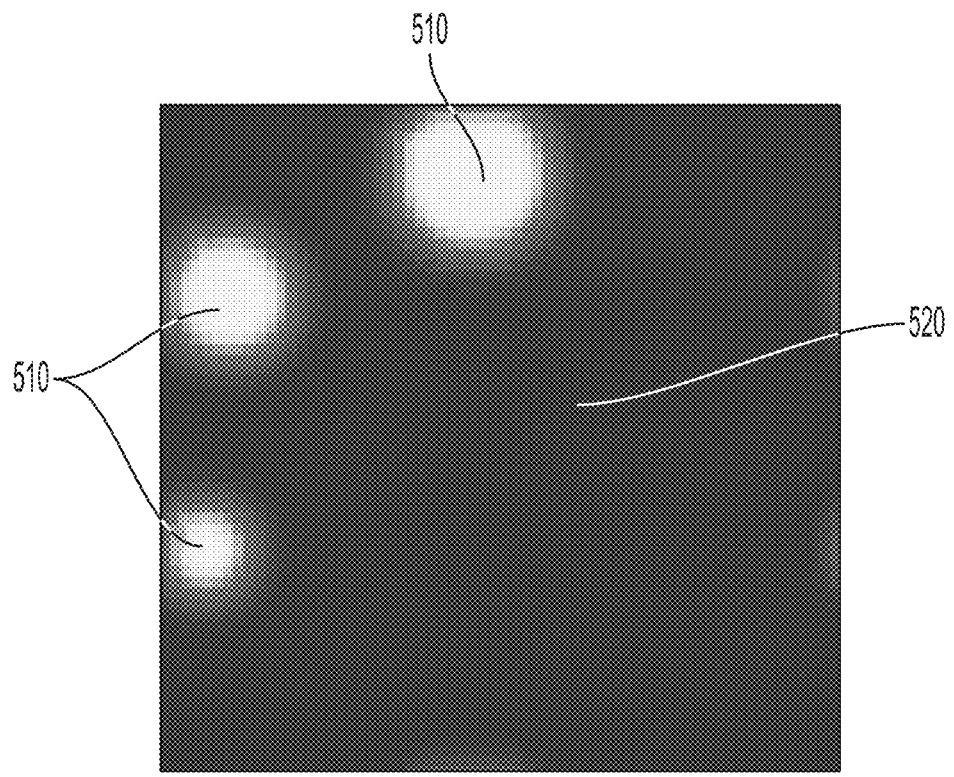
FIG. 5 is a diagram of physical workspace information according to an embodiment.

The physical workspace information may refer to information regarding the environment. For example, the physical workspace information may be a point cloud of the environment, a two-dimensional (2D) image of the environment, a three-dimensional (3D) image of the environment, video information of the environment, coordinate data of the environment, or the like. As shown in FIG. 5, the physical workspace information 500 may identify obstacles 510 within the environment, and regions 520 that do not include obstacles.

As further shown in FIG. 4, the method may include generating a configuration space map that partitions the environment into collision regions and non-collision regions, based on the physical workspace information (operation 420).

The robot 210 may generate a configuration space map that partitions the environment into collision regions and non-collision regions. For example, the robot 210 may generate the configuration space map based on receiving the physical workspace information, based on a time frame, or the like.

The configuration space map may refer to information that partitions the environment into collision regions and non-collision regions. A collision region may refer to a region of the environment in which the robot is not permitted to move. A non-collision region may refer to a region of the environment in which the robot is permitted to move.

Figure 6:
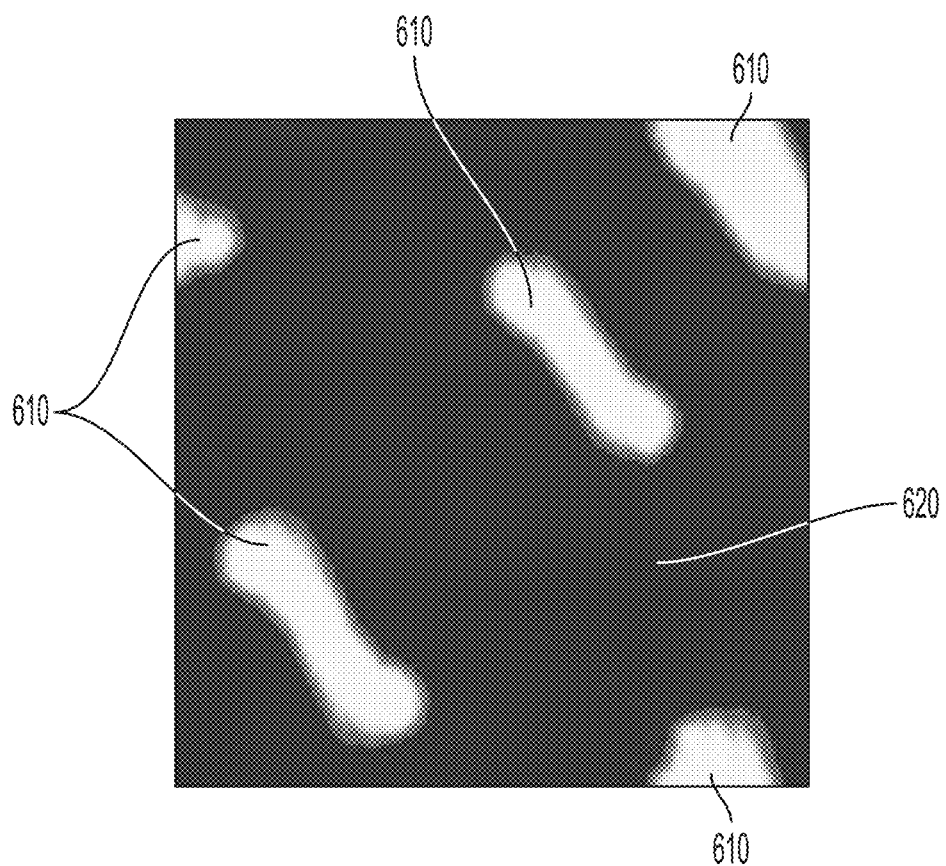
FIG. 6 is a diagram of a configuration space map according to an embodiment.

As shown in FIG. 6, the configuration space map 600 may include collision regions 610 and non-collision regions 620. The collision regions 610 may correspond to regions of the environment including obstacles 510 as shown in the physical workspace information, and the non-collision regions 620 may correspond to regions 520 of the environment that do not include obstacles.

The robot 210 may generate the configuration space map based on a configuration space mapping network. For example, the robot 210 may input the physical workspace information into the configuration space mapping network, and may obtain the configuration space map based on an output generated by the configuration space mapping network.

The robot 210 may generate the configuration space map based on configuration information of the robot 210. For example, the configuration information may be information identifying the size, spatial coordinates, movement configurations, etc. of the robot 210, may be an image of the robot 210, or the like.

As further shown in FIG. 4, the method may include obtaining, using a first neural network, a set of weights of a second neural network that is configured to generate a set of values associated with a set of configurations of the robot with respect to the second configuration, based on the configuration space map and the second configuration (operation 430).

For example, the robot 210 may use a first neural network to obtain a set of weights of a second neural network.

The first neural network may refer to a neural network that is configured to generate a set of weight values of a second neural network. For example, the first neural network may be a higher-order function network. The first neural network may be configured to obtain an input of a configuration space map and a second configuration, and generate a set of weights of the second neural network based on the input.

The second neural network may refer to a neural network that is configured to generate a set of values associated with a set of configurations of the robot 210 with respect to the second configuration. For example, the second neural network may be referred to as a "cost-to-go" network.

A configuration may refer to a position of the robot 210 within the environment. For example, a configuration may refer to the physical posture or pose of the robot 210 within the environment. The first configuration may refer to an initial configuration of the robot 210 within the environment. The second configuration may refer to a final configuration of the robot 210 that is different than the initial configuration of the robot 210.

A trajectory may refer to a movement path of the robot 210. For example, a trajectory between the first configuration and the second configuration may be a movement path of the robot 210 from the first configuration to the second configuration.

The set of weights may refer to weights of the second neural network. For example, the second neural network may be configured with a set of weights that affect the output of the second neural network.

The robot 210 may input the second configuration and the configuration space map into the first neural network, and may obtain the set of weights based on an output generated by the first neural network.

As further shown in FIG. 4, the method may include obtaining, by applying the set of weights to the second neural network, the set of values associated with the set of configurations of the robot with respect to the second configuration (operation 440).

For example, the robot 210 may apply the set of weights to the second neural network, and obtain a set of values based on an output generated by the second neural network to which the set of weights is applied.

The robot 210 may apply the set of weights to the second neural network by updating the second neural network, reconfiguring the second neural network, training the second neural network, reshaping the second neural network, etc.

Based on applying the set of weights to the second neural network, the robot 210 may input the configuration space map and the second configuration into the second neural network. The second neural network may generate the set of values, based on the configuration space map and the second configuration.

The set of values may refer to values that relate configurations of the robot 210 to the second configuration. Each position in the non-collision regions of the environment may correspond to a potential position of the robot 210. Accordingly, each position may be a potential configuration of the robot 210. In this way, the robot 210 may generate a map of the set of values that relates each configuration of the environment with a respective value. Further, in this way, the map of the set of values may be continuous over the entire configuration space.

Figure 7:
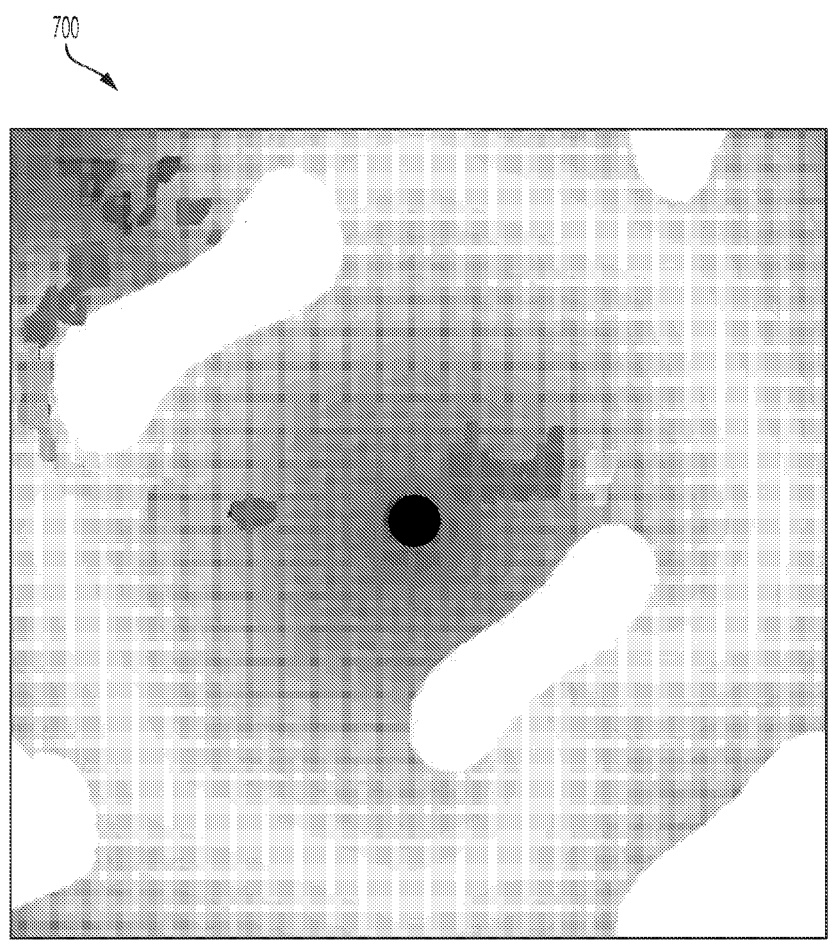
FIG. 7 is a diagram of a map of values according to an embodiment.

A value may represent a distance of the configuration to the second configuration. For example, a configuration that is close to the second configuration may have a relatively low value, whereas a configuration that is farther from the second configuration may have a greater value. As example, a configuration with the value "1" may be close to the second configuration, and a configuration with the value "8" may be farther from the second configuration. In this way, a value may be referred to as a "cost-to-go" value. As shown in FIG. 7, the robot 210 may generate a map of values 700 that associates each configuration within the environment with a respective value.

As further shown in FIG. 4, the method may include generating the trajectory of the robot from the first configuration to the second configuration within the environment, based on the set of values (operation 450).

For example, the robot 210 may generate a trajectory from the first configuration to the second configuration based on the set of values. The robot 210 may generate the trajectory based on a gradient of the set of values. For example, the robot 210 may generate the trajectory to pass through configurations from the first configuration to the second configuration such that the values of the configurations decrease.

Figure 8:
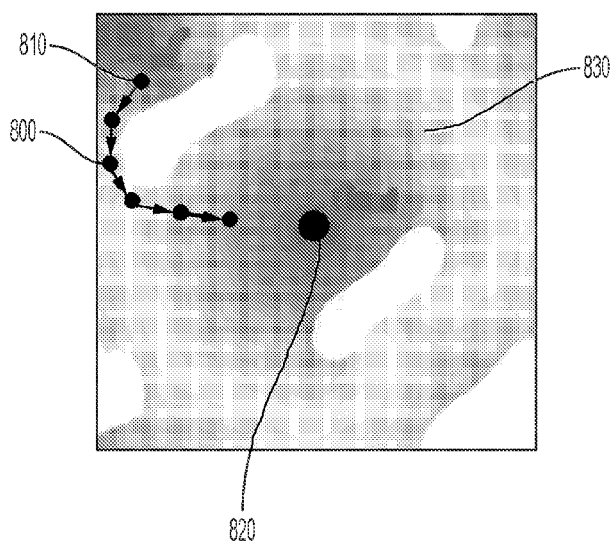
FIG. 8 is a diagram of trajectory generation according to an embodiment.

As shown in FIG. 8, the robot 210 may generate a trajectory 800 from the first configuration 810 to the second configuration 820 by following the gradient of the set of values 830. In this way, the embodiments of the present disclosure can generate a continuous set of values associated with a set of configurations of the robot with respect to the second configuration over an entire configuration space map much faster than approaches which construct configuration space map representations during execution.

In another embodiment, the robot 210 may generate the set of weights based on the physical workspace information (e.g., without using the configuration space map). Further, in another embodiment, the robot 210 may receive, from the server 220 and/or the user device 230, one or more of the configuration space map, the second configuration, the set of weights, the set of values, etc., and may generate the trajectory based on receiving the foregoing information.

Although FIG. 4 shows example operations, the method may include additional operations, fewer operations, different operations, or differently arranged operations than those depicted in FIG. 4. Additionally, or alternatively, two or more of the operations of the method may be performed in parallel.

Figure 9:
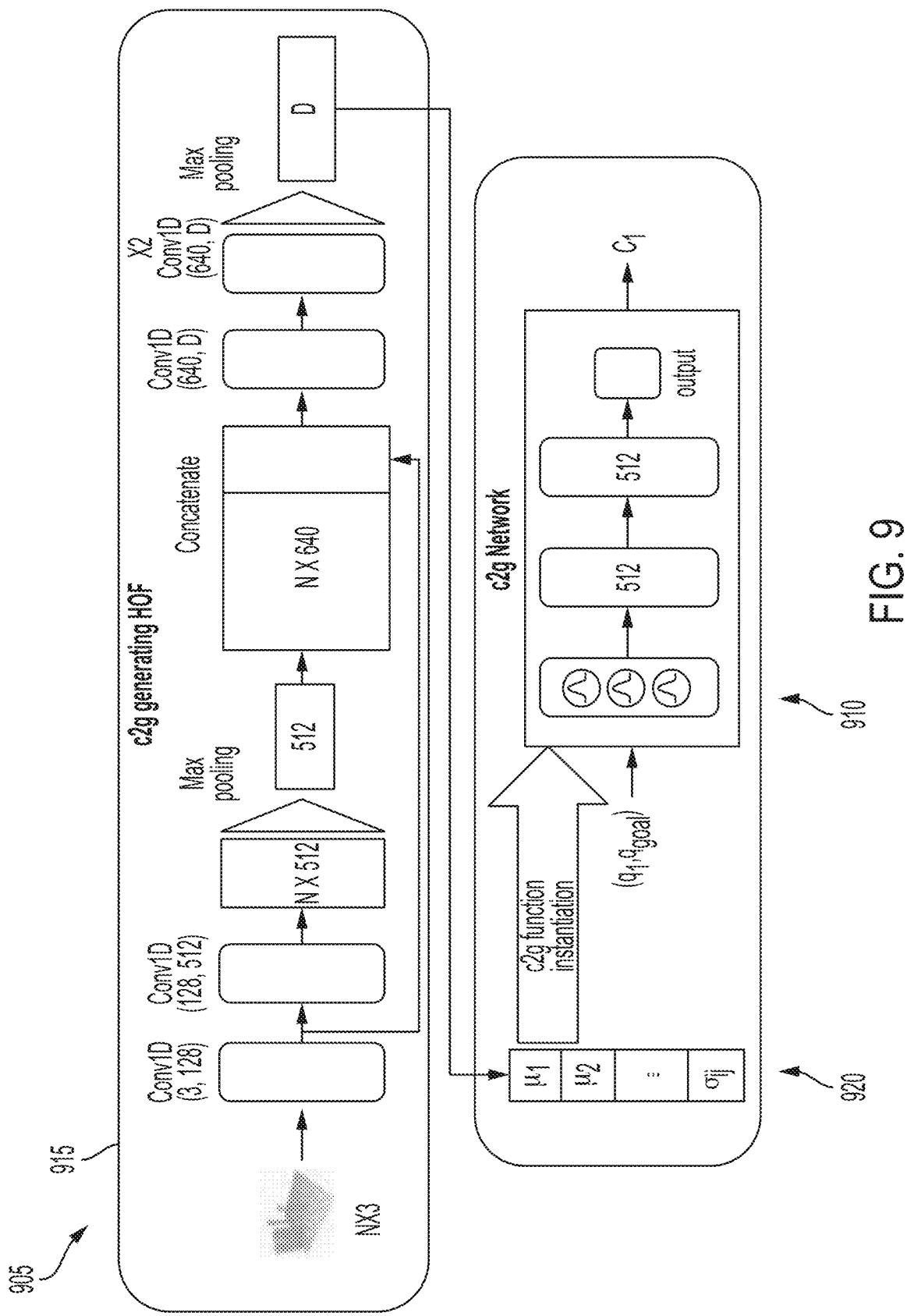
FIG. 9 is a diagram of a system for generating a trajectory of a robot from a first configuration to a second configuration within an environment while steering away from obstacles according to an embodiment.

FIG. 9 is a diagram of a system for generating a trajectory of a robot from a first configuration to a second configuration within an environment while steering away from obstacles according to an embodiment. As shown in FIG. 9, the system may include a first neural network 905 (e.g., a higher order function), and a second neural network 910 (e.g., a cost-to-go function represented by a radial basis function network). The robot 210 may be configured with one or more of the first neural network 905 and the second neural network 910.

The first neural network 905 may obtain physical workspace information 915 (e.g., a point cloud), and generate parameters 920 of the second neural network 910 based on the physical workspace information 915. The parameters 920 are reshaped to parameters of the second neural network 910 (e.g., the radial basis function network). In this way, the second neural network 910 may be configured with the reshaped parameters 920 (e.g., weights).

Figure 10:
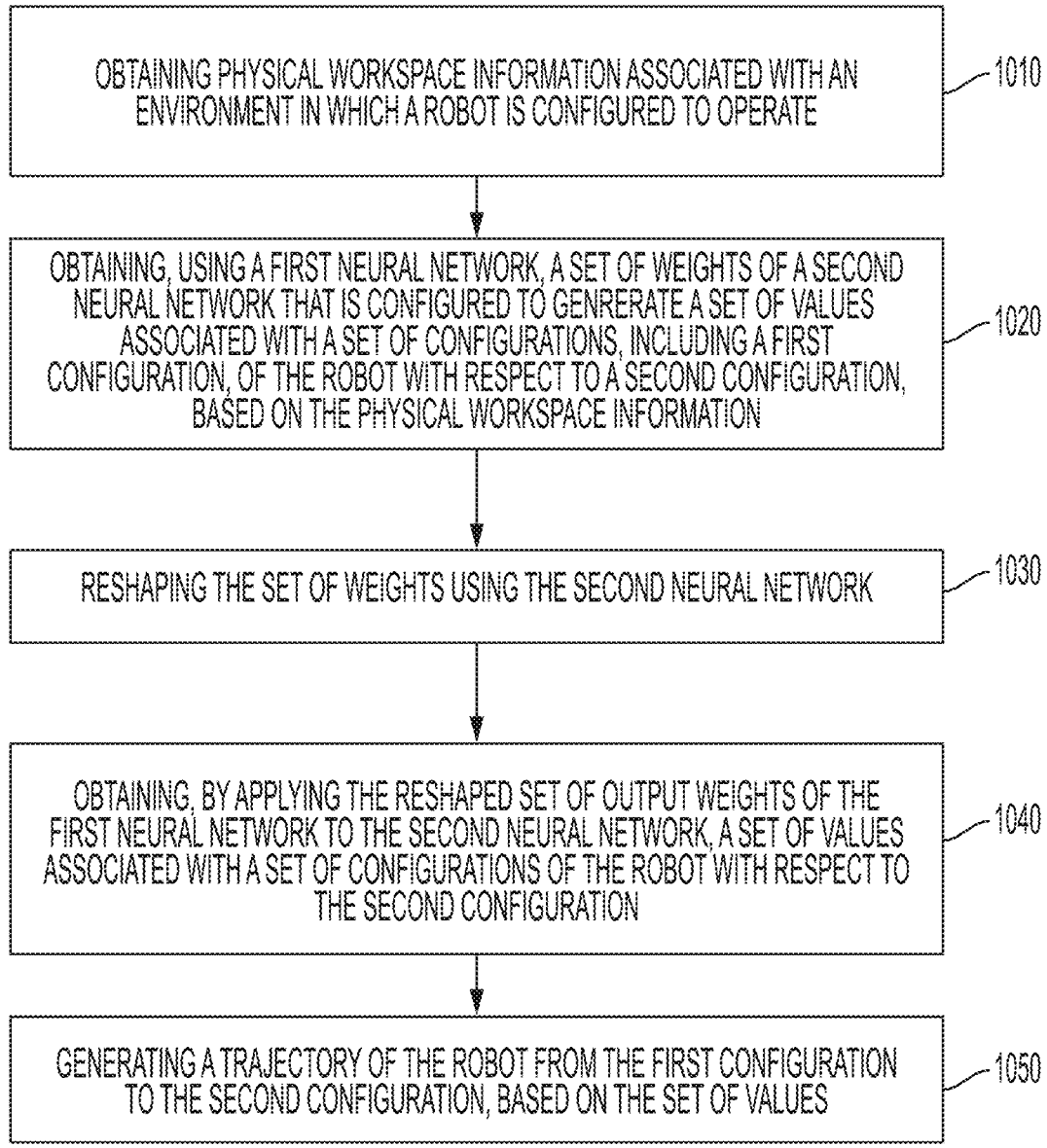
FIG. 10 is a flowchart of a method for generating a trajectory of a robot from a first configuration to a second configuration within an environment while steering away from obstacles.

FIG. 10 is a flowchart of a method for generating a trajectory of a robot from a first configuration to a second configuration within an environment while steering away from obstacles. According to some embodiments, one or more operations of FIG. 10 may be performed by the robot 210. Additionally, or alternatively, one or more operations may be performed by the server 220 and/or the user device 230.

As shown in FIG. 10, the process may include obtaining physical workspace information associated with the environment in which the robot is configured to operate (operation 1010), and obtaining, using a first neural network, a set of weights of a second neural network that is configured to generate a set of values associated with a set of configurations, including a first configuration, of the robot with respect to a second configuration, based on the physical workspace information (operation 1020).

As further shown in FIG. 10, the process may include reshaping the set of weights using the second neural network (operation 1030), and obtaining, by applying the reshaped set of output weights of the first neural network to the second neural network, a set of values associated with a set of configurations of the robot with respect to the second configuration (operation 1040). As further shown in FIG. 10, the process may include generating a trajectory of the robot from the first configuration to the second configuration within the environment, based on the set of values (operation 1050).

Although FIG. 10 shows example operations, the method may include additional operations, fewer operations, different operations, or differently arranged operations than those depicted in FIG. 10. Additionally, or alternatively, two or more of the operations of the method may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating a trajectory of a robot from a first configuration to a second configuration within an environment while steering away from obstacles, the method comprising:
    obtaining physical workspace information associated with the environment in which the robot is configured to operate;
    obtaining, using a first neural network, a set of weights of a second neural network that is configured to generate a set of values associated with a set of configurations of the robot with respect to the second configuration, based on the physical workspace information;
    obtaining, by applying the set of weights to the second neural network, the set of values associated with the set of configurations of the robot with respect to the second configuration;
    generating the trajectory of the robot from the first configuration to the second configuration within the environment, based on a gradient of the set of values;
    generating a configuration space map that partitions the environment into collision regions and non-collision regions, based on the physical workspace information; and
    reshaping the set of weights using the second neural network that is a radial basis function network.

2. The method of claim 1, wherein the first neural network is a higher-order function network.

3. The method of claim 1, wherein the physical workspace information is a point cloud associated with the environment, a two-dimensional image of the environment, or three-dimensional image of the environment.

4. The method of claim 1, wherein generating the configuration space map comprises generating the configuration space map based on inputting the physical workspace information into a configuration space network configured to generate the configuration space map.

5. A device for generating a trajectory of a robot from a first configuration to a second configuration within an environment while steering away from obstacles, the device comprising:
    a memory configured to store instructions; and
    a processor configured to execute the instructions to:
    obtain physical workspace information associated with the environment in which the robot is configured to operate;
    obtain, using a first neural network, a set of weights of a second neural network that is configured to generate a set of values associated with a set of configurations of the robot with respect to the second configuration, based on the physical workspace information;
    obtain, by applying the set of weights to the second neural network, the set of values associated with the set of configurations of the robot with respect to the second configuration;
    generate the trajectory of the robot from the first configuration to the second configuration within the environment, based on a gradient of the set of values;
    generate a configuration space map that partitions the environment into collision regions and non-collision regions, based on the physical workspace information; and
    reshape the set of weights using the second neural network that is a radial basis function network.

6. The device of claim 5, wherein the first neural network is a higher-order function network.

7. The device of claim 5, wherein the physical workspace information is a point cloud associated with the environment, a two-dimensional image of the environment, or three-dimensional image of the environment.

8. The device of claim 5, wherein the processor, when generating the configuration space map, is further configured to generate the configuration space map based on inputting the physical workspace information into a configuration space network configured to generate the configuration space map.

9. A non-transitory computer-readable medium storing instructions, the instructions comprising: one or more instructions that, when executed by one or more processors of a device for generating a trajectory of a robot from a first configuration to a second configuration within an environment while steering away from obstacles, cause the one or more processors to:
    obtain physical workspace information associated with the environment in which the robot is configured to operate;
    obtain, using a first neural network, a set of weights of a second neural network that is configured to generate a set of values associated with a set of configurations of the robot with respect to the second configuration, based on the physical workspace information;

obtain, by applying the set of weights to the second neural network, the set of values associated with the set of configurations of the robot with respect to the second configuration;

generate the trajectory of the robot from the first configuration to the second configuration within the environment, based on a gradient of the set of values;

generate a configuration space map that partitions the environment into collision regions and non-collision regions, based on the physical workspace information; and reshape the set of weights using the second neural network that is a radial basis function network.

10. The non-transitory computer-readable medium of claim 9, wherein the first neural network is a higher-order function network.

11. The non-transitory computer-readable medium of claim 9, wherein the physical workspace information is a point cloud associated with the environment, a two-dimensional image of the environment, or three-dimensional image of the environment.

* * * * *